United States Patent [19]

Suzuki et al.

[11] Patent Number: 4,647,984
[45] Date of Patent: Mar. 3, 1987

[54] TIME AXIS DEVIATION COMPENSATION APPARATUS

[75] Inventors: Toshio Suzuki; Masayoshi Yoshida; Tetsuo Shimizu, all of Tokorozawa, Japan

[73] Assignee: Pioneer Electronic Corporation, Tokyo, Japan

[21] Appl. No.: 722,665

[22] Filed: Apr. 12, 1985

[30] Foreign Application Priority Data

Apr. 12, 1984 [JP] Japan .................................. 59-073550
Apr. 12, 1984 [JP] Japan .................................. 59-073551

[51] Int. Cl.$^4$ ............................................. H04N 9/89
[52] U.S. Cl. ..................................... 358/326; 358/325
[58] Field of Search .......................... 358/19, 325, 326

[56] References Cited

U.S. PATENT DOCUMENTS

4,313,129 10/1979 Fukui ................................... 358/326
4,468,709 8/1984 Kenjyo ................................ 358/325

*Primary Examiner*—Donald McElheny, Jr.
*Attorney, Agent, or Firm*—Schwartz, Jeffery, Schwaab, Mack, Blumenthal & Evans

[57] ABSTRACT

An apparatus for compensation of time axis deviations of a reproduced composite video signal, based on detection of phase deviations of the horizontal sync and color burst components respectively of that video signal, incorporates a summing circuit in which are added a signal indicating the phase deviation of the horizontal sync component and a low-frequency signal component of the output from a phase comparator which detects phase deviations of the color burst component, with the sum output signal from the summing circuit being applied to control the delay produced by a variable delay line through which the video signal is transferred. The output signal from the latter phase comparator controls phase modulation by a phase modulator which receives the video signal from the delay line output. Fixed frequency reference signals, which can be derived from a single oscillator circuit, are employed for phase comparison of both the color burst and sync signal components, with no phase lock loop circuit being necessary.

6 Claims, 9 Drawing Figures

TIME AXIS DEVIATION COMPENSATION APPARATUS

BACKGROUND OF THE INVENTION

The present invention relates to an apparatus for performing compensation of time axis deviations in a composite video signal produced by a video reproduction apparatus. In particular, the present invention relates to an apparatus whereby time deviations in a color burst component of such a composite video signal, i.e. phase jitter resulting from the recording and playback process, can be precisely corrected to a very high degree of accuracy, with a simple circuit configuration which can be manufactured at low cost.

With a prior art type of apparatus for performing such time axis deviation correction, it is necessary to employ a complex circuit configuration incorporating a phase-lock loop. To achieve the necessary degree of correction accuracy, it is necessary both that this phase lock loop shall include an oscillator (used for phase comparison) which has a very high degree of frequency stability, so that this must in practice be a crystal-controlled oscillator, while in addition this oscillator must be capable of voltage control of the oscillation frequency, in order to provide phase lock operation. Due to these contradictory requirements, design and manufacture of such a phase lock loop circuit is difficult, and the cost is relatively high.

There is therefore a requirement for an apparatus whereby such correction of time axis deviations of a composite video signal produced by a video reproduction apparatus can be performed highly accurately, but without the disadvantages resulting from the incorporation of such a phase lock loop circuit.

SUMMARY OF THE INVENTION

With an apparatus according to the present invention for correcting time-axis deviations of a reproduced composite video signal, the above problems relating to phase lock loop 11 are overcome, since it is made unnecessary to incorporate such a circuit. In addition, an apparatus according to the present invention can be made to have a simple circuit configuration, while providing a high degree of accuracy of compensation of time-axis deviations. Furthermore, it is possible to incorporate a circuit whereby temporary severe disturbance of the input video signal is prevented from affecting operation of the apparatus, during the time immediately subsequent to recovery from such disturbance.

An apparatus according to the present invention essentially comprises a a variable delay line which can be controlled by variation of an operating parameter (e.g. a clock signal frequency), to produce corresponding variations in an amount of transmission delay provided thereby, and which is coupled to receive a composite video signal (produced from a video signal reproduction device such as a video disc player), a reference signal source for generating a first and a second reference frequency signal each having a fixed frequency, a first separator circuit for separating the horizontal sync signal from the composite video signal, a first phase detector for sensing a phase difference between the horizontal sync signal from the first separator circuit and the first reference frequency signal and producing an output signal indicative of the phase difference, a second separator circuit coupled to receive the composite video signal from the output of the variable delay line, for separating the color burst signal component from the video signal, a second phase detector (e.g. a phase comparator circuit) for sensing a phase difference between the color burst signal from the second separator circuit and the second reference frequency signal and producing an output signal indicative of the phase difference between these, a phase modulation circuit coupled to receive the composite video signal from the variable delay line output and controlled by the output signal from the second phase detector, for applying phase modulation to the composite video signal in accordance with the second phase detector output signal, a low-pass filter which is coupled to receive the output signal from the second phase detector, for deriving a low-frequency signal component of that signal, a summing circuit for summing the low-frequency signal component of the second phase detection output signal and the output signal from the first phase detector, to produce a sum output signal, and a parameter control circuit coupled to receive the sum output signal, for varying the control parameter of the variable delay line (e.g. by varying the frequency of the clock signal which drives the delay line, in the case of a CCD delay line) in accordance with the sum output signal, to thereby vary the amount of delay applied to the composite video signal by the variable delay line in accordance with the sum of the low-frequency component of the second phase detection output signal and the output signal from the first phase detector.

In this way, the amount of delay produced by the variable delay line is adjusted in accordance with the output signal from the summing circuit such as to compensate for any time axis deviations of the horizontal sync signal component and the color burst signal component in the composite video signal, i.e. deviations detected with respect to the fixed-frequency reference signals. In addition, the output signal from the second phase detector controls the degree of phase modulation which is applied to the video signal by the phase modulation circuit, to compensate for phase deviations of the color burst component. In this way, it is made unnecessary to employ a phase-lock loop for that purpose, and the overall circuit configuration can be made simple, while precise suppression of time axis deviations of the color burst component of the composite video signal can be attained.

DESCRIPTION OF THE PREFERRED EMBODIMENTS

Before describing embodiments of the present invention, a description will be given of an example of a prior art apparatus having similar objectives to the present invention. This example is shown in general block diagram form in FIG. 1, in which numeral denotes a CCD (charge-coupled device) type of variable delay line, i.e. a delay line whereby the degree of delay produced therein can be controlled in accordance with a control parameter, which in this example is the frequency of a control signal. A composite video signal is applied as signal A to the input of CCD variable delay line 1. Numeral 2 denotes a sync separator circuit for deriving a horizontal sync signal from the composite video signal which is output from variable delay line 1 as signal B. Numeral 3 denotes a reference signal generating circuit for generating a reference signal, having a frequency which is typically approximately 15.75 KHz. Numeral 4 denotes a phase comparator circuit, which serves to detect any difference between the phase of the horizontal sync signal which is output from sync separator circuit 2 and the reference signal which is output from reference signal generating circuit 3, and producing an output signal indicative of the magnitude of such a phase difference. Numeral 5 denotes a servo amplifier circuit for amplifying the output signal from phase comparator circuit 4, and which includes components for performing phase correction. The output signal thus produced from servo amplifier 5 is input to a VCO (voltage-controlled oscillator circuit) 6, whose frequency of oscillation is controlled in accordance with the amplitude and sign of the output signal from servo amplifier 5. The oscillation signal thus produced by VCO 6 is applied as a clock signal, which drives variable delay line 1, i.e. the amount of delay produced between output signal B and input signal A of variable delay line 1 is determined in accordance with the frequency of oscillation of VCO 6. The relationship between the control signal which is thus applied to variable delay line 1 from VCO 6 and any phase difference between the reference signal from reference signal generating circuit 3 and the horizontal sync signal from sync separator circuit 2 is such that the control signal acts to produce a change in the amount of delay produced by variable delay line 1 in a direction tending to reduce that phase difference.

Figure 1:
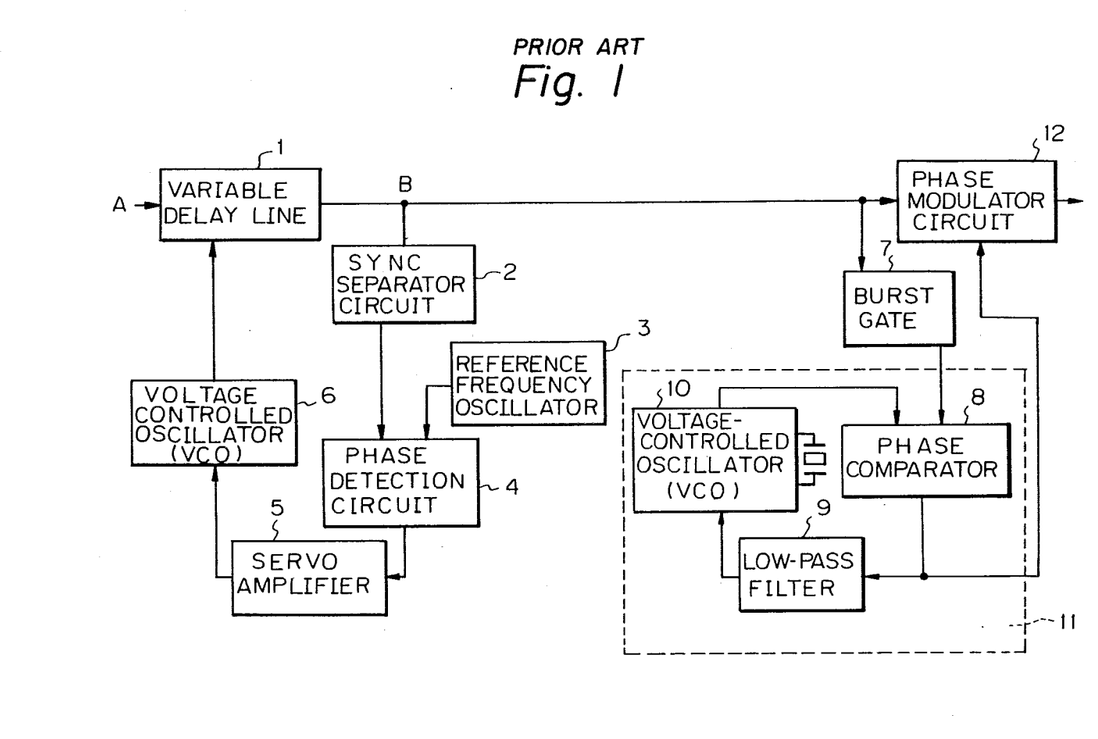
FIG. 1 is a block circuit diagram of a prior art apparatus for correction of time axis deviations in a reproduced composite video signal containing a color burst component.

Numeral 7 denotes a burst gate circuit, which derives the color burst component of the composite video signal, and applies the resultant color burst signal to one input of a phase comparator circuit 8. Phase comparator 8 serves to compare the phase of this input signal from burst gate circuit 7 with an output signal from a VCO (voltage-controlled oscillator circuit), and produce an output signal indicative of any phase difference between these. This output signal from phase comparator circuit 8 is input to a low-pass filter 9, whose output signal is applied to VCO 10 to control the frequency of oscillation thereof. It can thus be understood that phase comparator circuit 8, low-pass filter 9 and VCO 10 constitute in combination a phase-lock loop (PLL) 11. The output signal from this PLL 11 (i.e. the output signal from phase comparator circuit 8) is applied to a phase modulator 12 which is coupled to receive signal B from the output of CCD variable delay line 1.

The operation of this prior art example is as follows. Any phase difference between the horizontal sync signal which is derived by sync separator circuit 2, and the reference signal which is generated by reference signal generating circuit 3 is detected by phase comparator circuit 4, and a corresponding output signal is output from phase comparator circuit 4 and is amplified and adjusted in phase by servo amplifier 5. The frequency of oscillation of VCO 6 is controlled by the output signal from servo amplifier 5, and the output signal from VCO 6 is applied to control the amount of delay produced by variable delay line 1 such that deviations of input video signal A with respect to the time axis are corrected, i.e. a negative feedback control loop is formed by the circuit combination of sync separator circuit 2, reference signal generating circuit 3, phase detection circuit 4, servo amplifier 5, VCO 6 and variable delay line 1. The degree of suppression of time-axis deviations of the input video signal which is provided by the latter control loop serves to stabilize output signal B from variable delay line 1 to a sufficient extent to enable detection and correction of phase deviations of the color burst signal component in signal B, by means of PLL 11. That is to say, the color burst signal which is output from burst gate circuit 7 is compared in phase with the output signal from VCO 10, and a signal indicating any phase difference between these, i.e. representing a phase deviation of the color burst signal, is produced by phase comparator circuit 8. Long-term compensation for such phase deviations of signal B is provided by the output signal thereby produced from low-pass filter 9, acting on VCO 10. However direct phase correction of the composite video signal, to immediately correct such a phase deviation, is performed by phase modulator 12 in response to the latter output signal from phase comparator circuit 8. An output composite video signal is thereby produced by phase modulator 12, designated as signal C, in which time axis deviations are effectively suppressed.

With such a prior art type of apparatus, it is necessary to incorporate a phase lock loop circuit 11, to detect relatively rapidly-occurring deviations in phase of composite video signal D, as indicated by phase deviations of the color burst component in that video signal. The frequency of oscillation of VCO 10 in this phase lock loop circuit must also remain phase-locked with the color burst signal. From a design standpoint, it is difficult to meet both the requirements for optimum phase-lock loop operation and also optimum phase deviation detection operation, so that in practice such a circuit presents various problems. In addition, VCO 10 in phase lock loop 11 must be capable of extremely precise frequency control, i.e. must generally be a crystal-controlled oscillator circuit. Thus, incorporation of such a phase lock loop will render the overall circuit design of the apparatus more complex, and increase the manufacturing cost.

Figure 2:
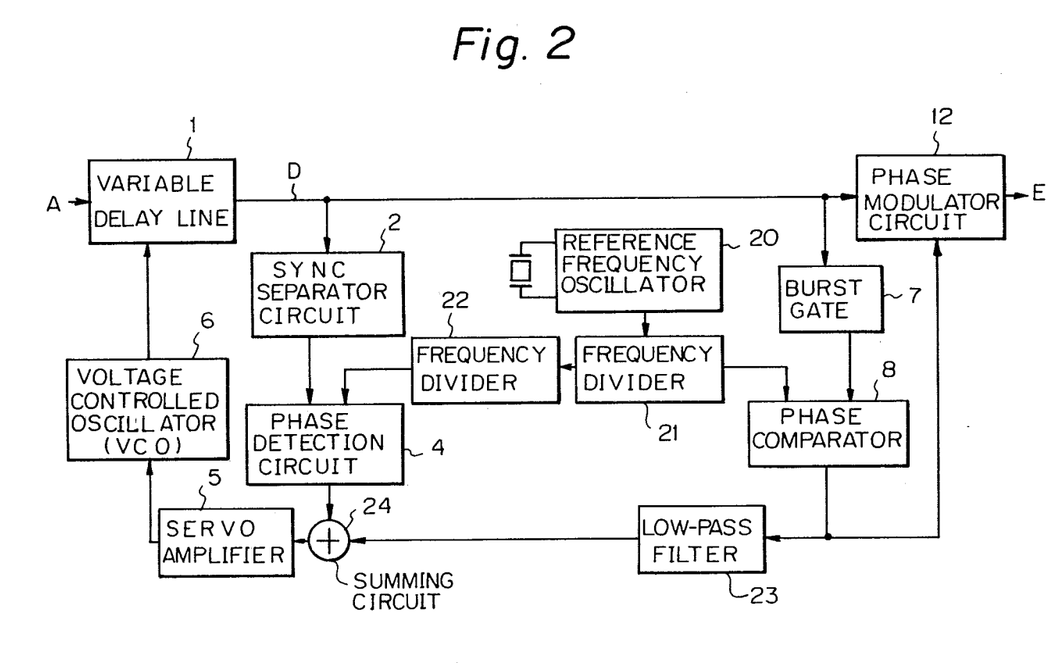
FIG. 2 is a general block circuit diagram of a first embodiment of an apparatus according to the present invention for correction of time axis deviations in a reproduced composite video signal containing a color burst component.
Figure 3:
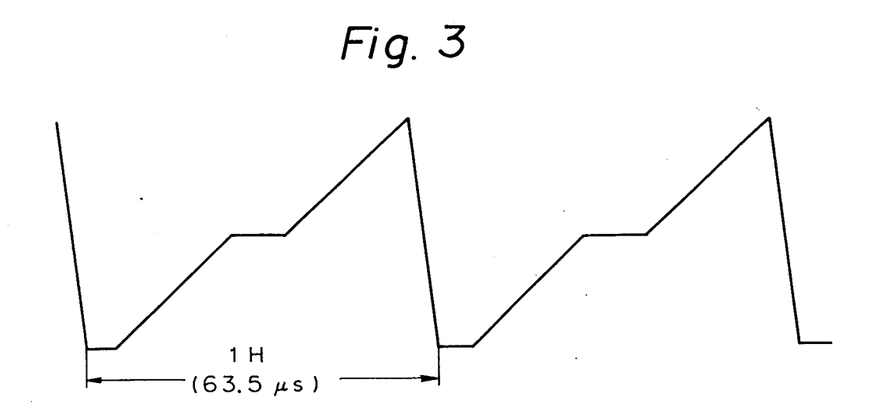
FIG. 3 is a waveform diagram for assistance in describing a phase detection circuit in the embodiment of FIG. 2.

Referring now to FIG. 2, a first embodiment of an apparatus according to the present invention for correction of time axis deviations in a reproduced composite video signal is shown, in general block circuit diagram form. In FIG. 2, components having identical functions to components in the prior art example of FIG. 1 are indicated by corresponding reference numerals. As in the prior art example, a negative feedback control loop is formed to control the amount of delay applied to the composite video signal by variable delay line 1, this control loop comprising variable delay line 1, sync separator circuit 2, servo amplifier 5 and VCO 6. It will be understood that it is possible to utilize other types of delay line, which may be controlled by some parameter other than clock signal frequency, so that, in general, the combination of servo amplifier 5 and VCO 6 constitute a parameter control circuit, for controlling the amount of delay produced by variable delay line 1 in accordance with an input signal applied to that parameter control circuit. In the embodiment of FIG. 2, a summing circuit is connected within this loop, i.e. the input signal to servo amplifier 5 is provided from the output of a summing circuit 24, with the output signal from phase detection circuit 4 being applied to one input of summing circuit 24. Numeral 20 denotes a reference frequency oscillator circuit, for producing a highly stable reference frequency signal which is input to a frequency divider circuit 21, whose output is applied to a second frequency divider circuit 22. First and second reference frequency signals are thereby output from frequency divider circuits 21 and 22 respectively, suitable for input to phase comparator circuit 8 and phase detection circuit 4 respectively, e.g. a first reference frequency signal whose period is equal to that of the horizontal sync signal component of the composite video signal, and a second reference frequency signal whose period is equal to that of the color burst component, i.e. the period of the burst rate. Phase detector circuit 4 can conveniently be based upon a sample-and-hold circuit, employing a waveform as shown in FIG. 3, produced from the first reference frequency signal.

The color burst component of the composite video signal output from variable delay line 1 is derived by burst gate 7, and the resultant color burst signal is input to phase comparator 8, together with the second reference frequency signal referred to above. The output signal from phase comparator circuit 8, representing time axis deviations of the color burst signal, is input to phase modulator circuit 12, as in the prior art example, to control phase modulation of the composite video signal, and in addition is input to a low-pass filter 23. The resultant output signal from low-pass filter 23, representing the low-frequency component of the time axis deviations of the color burst signal, is applied to the other input of summing circuit 24.

It can thus be understood that the output signal from summing circuit 24 is the sum of a first input signal, which is produced by the combination of first derivation means (i.e. sync separator circuit 2) and first phase detection means (phase detection circuit 4) and which corresponds to the amount of time axis deviations of the composite video signal which is output from variable delay line 1 as represented by the time axis deviations of the horizontal sync signal component of that composite video signal, measured at the timing of successive horizontal sync pulses, and a second input signal which is produced by the combination of second derivation means (burst gate 7) and second phase detection means (phase comparator circuit 8) together with a low-pass filter, and which corresponds to the low-frequency component of the time axis deviations of the composite video signal which is output from variable delay line 1, as represented by the time axis deviations of the color burst component of that signal.

Before initial operation of this embodiment, it is necessary to adjust the circuit such that, when an input signal A having zero time axis deviations is applied to variable delay line 1, the operating point of phase detection circuit 4 is set to the center of the control range thereof, and such that the lock point of phase comparator circuit 8 is also set to the center of the control range.

Figure 4:
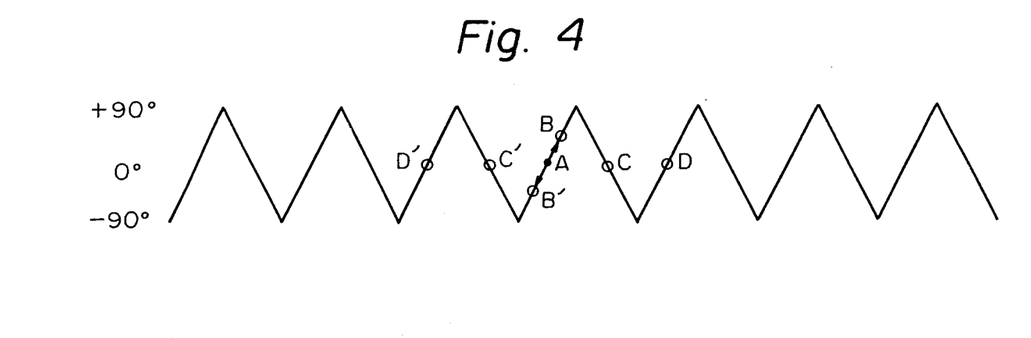
FIG. 4 is a diagram for assistance in describing a phase lock operation of the embodiment of FIG. 2.

The principles of operation of this circuit can be understood if it is first assumed that the output signal from low-pass filter 23 is disconnected from summing circuit 24. In this condition, the degree of suppression of time axis deviations of the input composite video signal A that is provided by the negative feedback control loop (based on variable delay line 1 and described above and referred to in the following as the input control loop) will be sufficient to ensure that the control loop formed by burst gate 7, phase comparator circuit 8 and phase modulator circuit 12 (referred to in the following as the output control loop) can precisely correct time axis deviations of the color burst component of composite video signal D (output from variable delay line 1). In this way, output signal E from phase modulator circuit 12 will be substantially free from time axis deviations, due to the phase control action applied by phase modulator circuit 12 in response to the output signal from phase comparator circuit 8. However in actual practice, there will inevitably be a certain amount of relatively slowly varying time axis deviations of output composite video signal D from variable delay line 1. Such slowly varying time axis deviations can result for example from the effects of temperature upon circuit components, e.g. due to the temperature coefficient of VCO 6. The maximum range of control which can be provided by the control loop formed of burst gate circuit 7, phase comparator circuit 8 and phase modulator circuit 12 will be equal to one period of the color burst signal, i.e. one half-period of the burst rate. In the diagram of FIG. 4, the lock point of this control loop is illustrated graphically, with the range from +90° to −90° corresponding to one-half of the burst rate period. If the lock point of the output control loop is assumed to be positioned at A in FIG. 4, then this is the optimum point with respect to maximizing the control range. However even if the circuit is initially adjusted to set the output control loop to this optimum lock point A (i.e. with an input composite video signal having no time axis deviations being applied to the apparatus), the slowly varying time axis deviations of the composite video signal output from variable delay line 1 referred to above will result in the lock point of the output control loop moving from A to, for example, point B or B'. As a result, it may not be possible for the output control loop to control a rapidly varying time axis deviations of composite video signal D, so that the lock point jumps (through an unstable point such as C or C') to some other point such as D or D'. Stable operation of the circuit therefore cannot be assured.

In the case of the prior art example of FIG. 1 above, such problems will not arise, since phase lock loop 11 will maintain phase lock, compensating for such slowly varying time axis deviations of the composite video signal output from variable delay line 1, so long as the lock range is not exceeded. This is due to the fact that the frequency of the reference signal source in phase lock loop 11 (i.e. VCO 10) will vary in frequency such as to compensate for slowly varying shifts in phase of the input signal. However in the case of the embodiment of the present invention in FIG. 2, the reference signal which is applied to phase comparator circuit 8 is fixed in frequency, so that if summing circuit 24 were not employed, a shift of lock point would take place.

However with the present invention, the output signal from phase comparator circuit 8 is passed through low-pass filter 23, to derive a low-frequency component of that output signal, which is then added to the output signal from phase detection circuit 4 by means of summing circuit 24. In this way, any slowly varying change in the lock point of the output control loop will result in a corresponding change in the output signal from low-pass filter 23, and hence in the output signal from summing circuit 24. As a result, the degree of delay provided by variable delay line 1 will be adjusted (by a change in frequency of VCO 6) in a continuous manner in responses to the latter output signal from low-pass filter 23, such as to apply time-axis correction to composite video signal D output from variable delay line 1, whereby the lock point of the output control loop is held fixed, e.g. at the optimum position thereof as described with reference to FIG. 4.

Since with the present invention, reference frequency oscillator 20 is a fixed-frequency oscillator circuit, a high degree of frequency precision can be much more readily attained than in the case of a crystal-controlled VCO oscillator utilized in a phase lock loop, as used in the prior art example of FIG. 1. Thus, the present invention, in addition to eliminating such a phase lock loop, enables an output signal E to be produced from phase modulator circuit 12 which has extremely precise correction of time axis deviations therein. It can be understood from the above description that an apparatus according to the present invention essentially comprises, in addition to variable delay line 1, a source of first and second reference frequency signals, a first separator circuit (i.e. sync separator circuit 2) for separating the horizontal sync component from the video signal, a first phase detection circuit (i.e. phase detection circuit 4) for detecting a phase difference between the separated horizontal sync signal and the first reference frequency signal, a second separator circuit (i.e. burst gate 7) for separating the color burst component from the video signal which is output from variable delay line 1, a second phase detection circuit (i.e. phase comparator 8) for detecting a phase difference between the separated color burst signal and the second reference frequency signal, a phase modulator ciruit for phase modulating the output signal from the variable delay line in accordance with the phase difference detected by the second phase detection circuit, a low-pass filter for deriving a low-frequency signal component of the output signal from the second phase detector, a summing circuit for summing this low-frequency signal component and the output signal from the first phase detection circuit, and a parameter control circuit (i.e. servo amplifier 5 and VCO 6) for controlling the delay produced by the variable delay line in accordance with the output signal from the summing circuit.

Figure 5:
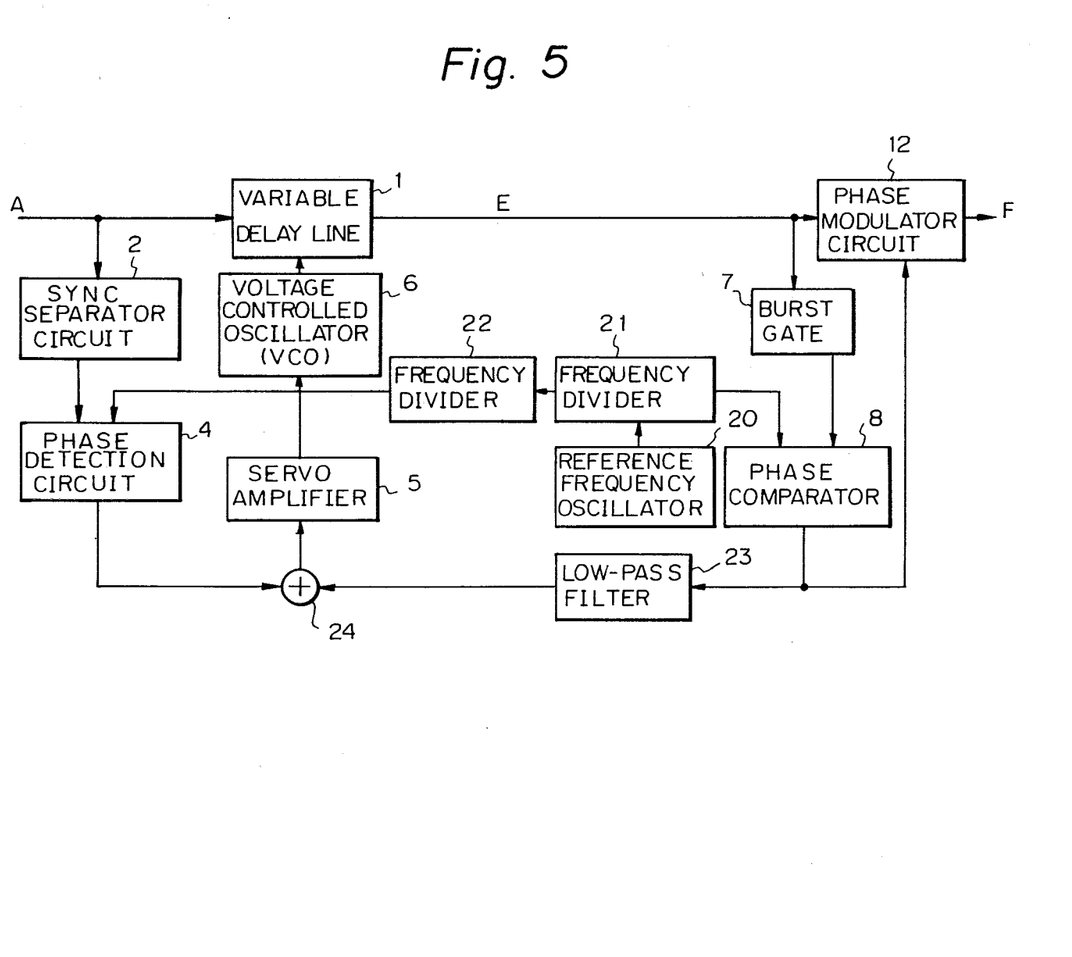
FIG. 5 is a general block circuit diagram of a second embodiment of an apparatus according to the present invention, in which open-loop control of an input composite video signal is employed.

FIG. 5 is a block circuit diagram of another embodiment of the present invention, which is essentially identical to that of FIG. 2, with the difference being that the input control loop in the embodiment of FIG. 5 is of open-loop type, i.e. without negative feedback being applied, since input composite video signal signal A is applied as the input signal to sync separator circuit 2 of the input control loop.

Figure 6:
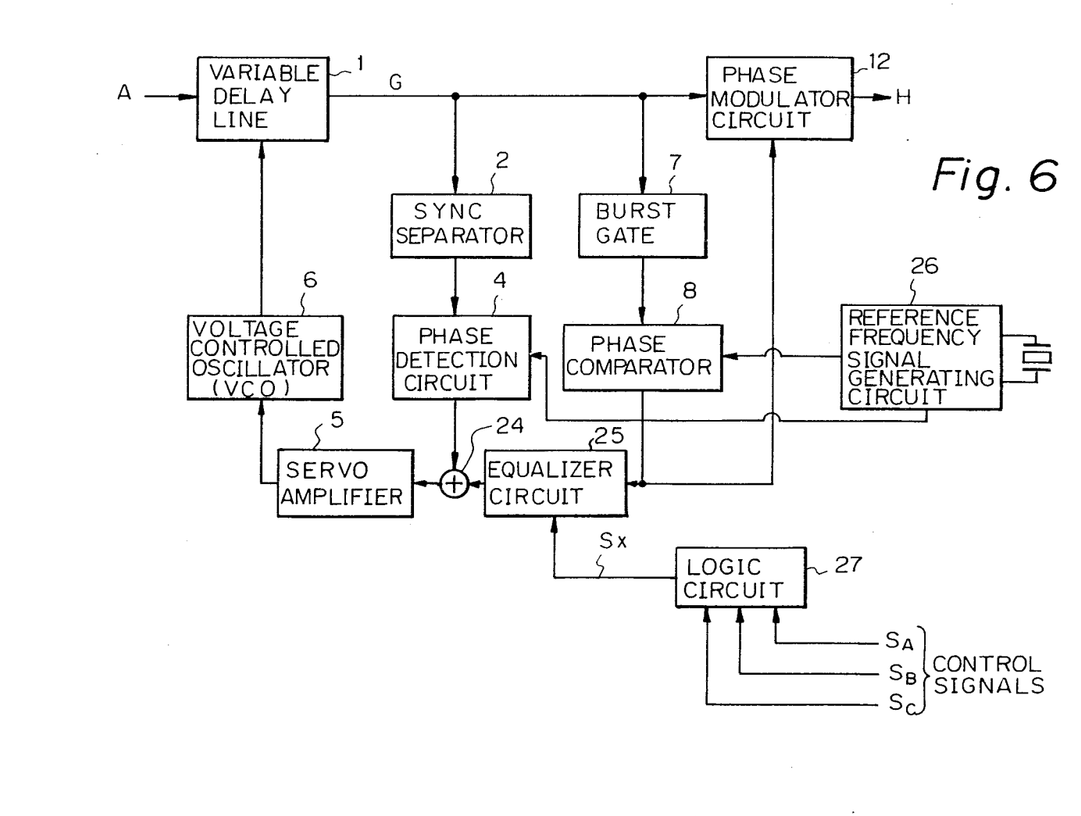
FIG. 6 is a general block circuit diagram of a second embodiment of an apparatus according to the present invention.

FIG. 6 is a general block circuit diagram of a third embodiment of the present invention. If a disruption of the composite video signal input to an apparatus according to the present invention as described hereinabove should occur, which is of substantial duration, producing corresponding disruption of the color burst component of the output composite video signal from variable delay line 1, then it is possible for a condition to be induced in low-pass filter 23 whereby an erroneous output voltage will be produced from the output of low-pass filter 23 which will continue for some time after the recovery from the latter disturbance has occurred. This condition can result, for example, by charge being accumulated upon one or more capacitors within low-pass filter 23, as a result of an abnormal condition of the output voltage from phase comparator circuit 8 due to the disturbance of the color burst component. The embodiment of FIG. 6 is designed to overcome this problem, and to ensure rapid recovery of control by the apparatus as soon as the disturbed condition of the input color burst component ceases. In FIG. 6, components which correspond to those in the embodiment of FIG. 2 are indicated by corresponding reference numerals, however the combination of reference frequency oscillator 20 and frequency dividers 21 and 22 shown in FIG. 2 is indicated simply as a reference frequency signal generating circuit 26 in FIG. 6. Numeral 25 denotes an equalizer circuit, which essentially comprises a low-pass filter to perform the function of low-pass filter 23 in the embodiment of FIG. 2, and means for controlling abnormal operation of the low-pass filter in the event of an abnormal input signal condition occurring which produces a severe disturbance of the time axis data of the color burst component, i.e. by clamping the output voltage from the low-pass filter at a fixed value for the duration of the disturbance. Numeral 27 denotes a logic circuit which produces a control signal $S_x$ to control the operation of equalizer circuit 25 during such an abnormal input signal condition. Logic circuit 27 receives several control signals, designated in this example as $S_A$, $S_B$ and $S_C$, which are provided by the reproduction apparatus which produces input composite video signal A, e.g. a video disc player. Logic circuit 27 determines, on the basis of these control signals, when a disturbed condition of the input composite video signal has occurred which will be of sufficient severity to affect the operation of equalizer circuit 25, and sets control signal $S_x$ to a corresponding logic state, for the duration of this disturbed condition.

Figure 7:
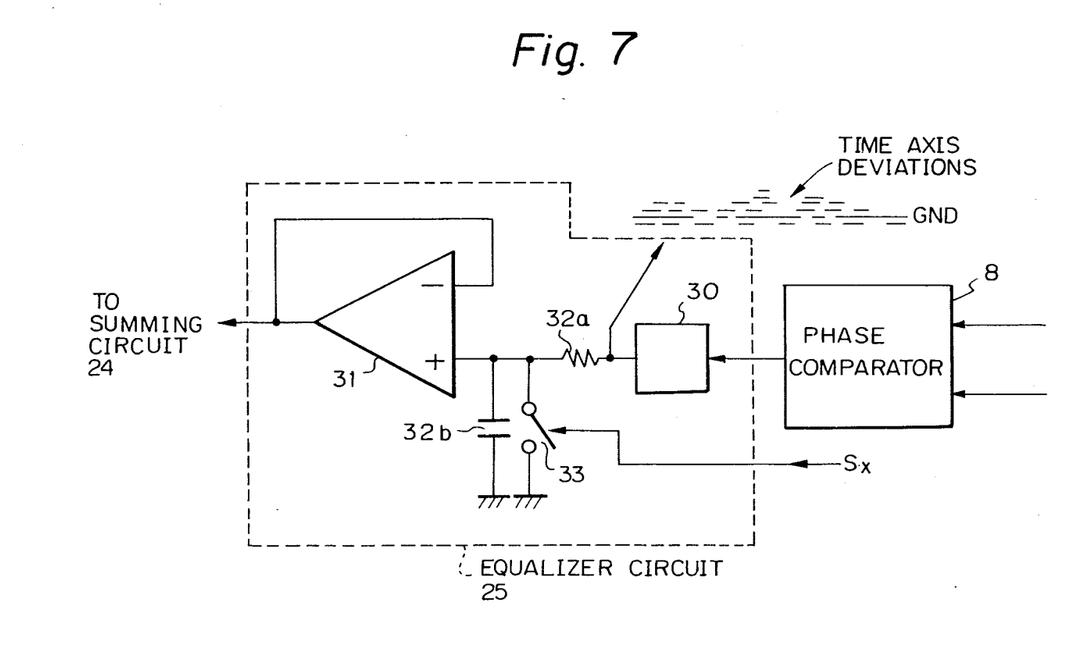
FIG. 7 is a circuit diagram of an equalizer circuit used in the embodiment of FIG. 6.
Figure 8A:
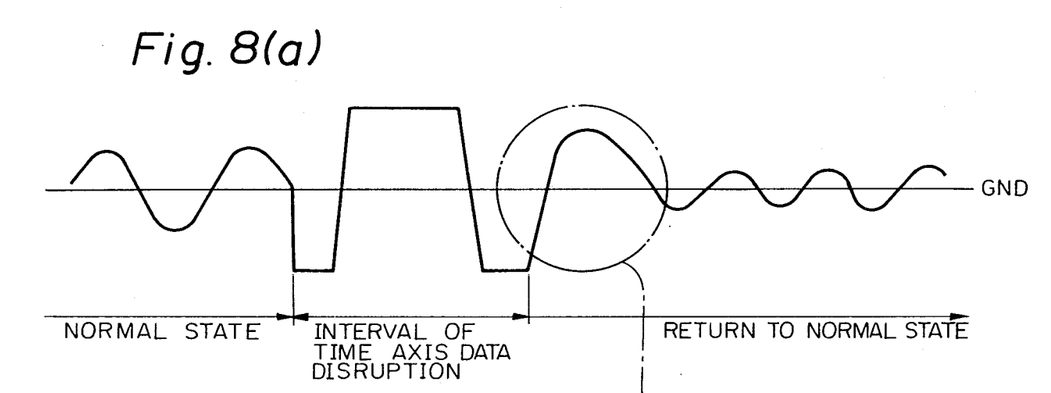
FIG. 8(a) and 8(b) are waveform diagrams for assistance in describing the operation of the equalizer circuit of FIG. 7.
Figure 8B:
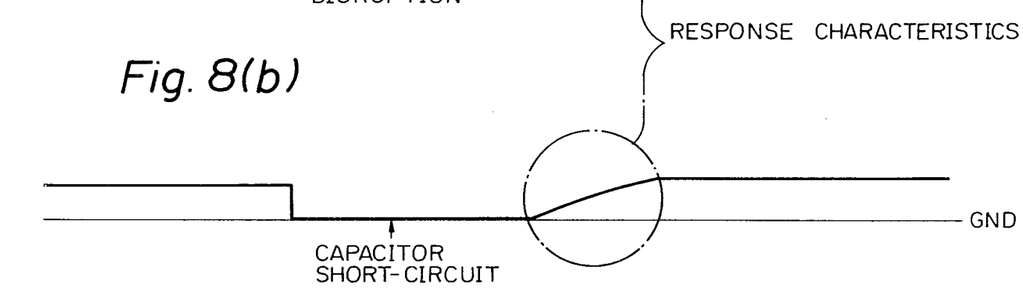

FIG. 7 is a circuit diagram of an embodiment of equalizer circuit 25. Numeral 30 denotes a circuit which serves to eliminate the DC component of the output signal from phase comparator circuit 8, to produce an output signal of the form shown in FIG. 8(a). This signal is applied to a simple low-pass filter comprising a resistor 32a and capacitor 32b, connected in series between the output of circuit 30 and ground. A low-frequency component of the output signal from phase comparator circuit 8 thereby appears across capacitor 32b, and is input to a buffer amplifier 31, whose output is applied to one input of summing circuit 24. A switch 33, controlled by signal $S_x$ from logic circuit 27, is connected across capacitor 32b. The operation of this circuit is as follows. The output signal from equalizer circuit circuit 25 corresponding to the input signal waveform thereto shown in FIG. 8(a), is illustrated in FIG. 8(b). During normal operation, as illustrated by the left-hand portion of FIGS. 8(a) and 8(b), a potential will appear at the output of equalizer circuit 25 which will vary only slowly, to compensate for slowly varying changes in the time axis deviations of output signal G from variable delay line 1 in FIG. 6, to thereby stabilize the lock point of the output control loop formed by burst gate 7, phase comparator circuit 8 and phase modulator circuit 12 as described hereinabove. When a disruption of the color burst component input to the system occurs, then this may result in a the control range of the output control loop being exceeded, resulting in large-amplitude voltage swings occurring in the output signal from phase comparator circuit 8, as shown. However immediately such a disruption of the color burst component begins, this is sensed by logic circuit 27, whereby control signal $S_x$ is generated, acting to close switch 32b and hence apply a short-circuit across capacitor 32b. This short-circuit condition, which clamps the output voltage from equalizer circuit 25 at ground potential in this embodiment, is continued until the disturbed condition of the reproduced composite video signal is terminated. Control signal $S_x$ is then also terminated, whereby switch 33 is opened, and charging of capacitor 32b through resistor 32a begins. In this way, a gradual and smooth return of the output signal from equalizer circuit 25 to an appropriate level is accomplished, after termination of the disturbance in the color burst component.

In this way, very rapid and stable recovery of control operation will take place after any temporary large-scale disruption of composite video signal input signal A.

Control signal $S_A$ in this embodiment can for example comprise a signal indicating that the amount of phase deviation of the derived horizontal sync signal produced from sync separator circuit 2, measured with respect to the reference frequency signal input to phase detection circuit 4, exceeds a predetermined limit value. Control signal $S_B$ can be a signal which indicates that the video data playback apparatus to which the circuit of the invention is connected is being operated in "scan" mode, i.e. assuming that the playback apparatus is a video disc player. In this case, too, control signal $S_C$ can be a signal which indicates that the readout point of the pick-up of the disc player has overshot a recording track. It should be understood that such control signals will normally be available from the apparatus which produces the reproduced composite video signal, i.e. a video disc player, and for this reason the means for generating these control signals do not form a part of an apparatus according to the present invention as set out in the claims.

In the embodiment of FIG. 7, a short-circuit is applied across capacitor 32b for the duration of a disturbance in the composite video signal, i.e. a disruption of the time-axis data contained in that signal. However it is equally possible to hold the potential across capacitor 32b at a fixed level, in response to detection of a disruption of the composite video signal. It can thus be understood that the essential function of controlled switch 33 in this embodiment is to inhibit transfer of the low-frequency component of the output signal from phase comparator 8 to summing circuit 24, under the control of an output signal from logic circuit 27, which constitutes means for sensing the status of the composite video signal, to detect a disturbed condition thereof.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting manner.

What is claimed is:

1. An apparatus for compensation of time axis deviations of a composite video signal which includes a horizontal sync signal and a color burst signal, and which is produced by a video signal reproduction device, the apparatus comprising:

a variable delay line which is controllable in response to variation of an operating parameter thereof for producing corresponding variations in an amount of transmission delay provided thereby, and which is coupled to transfer said composite video signal from an input thereof to an output thereof;

means for generating a first and a second reference frequency signal each having a fixed frequency;

first separator circuit means for separating said horizontal sync signal from said composite video signal;

first phase detection means for sensing a phase difference between said horizontal sync signal from said first separator circuit means and said first reference frequency signal and producing an output signal indicative of said phase difference;

second separator circuit means coupled to receive said composite video signal from said output of said variable delay line, for separating said color burst signal therefrom;

second phase detection means for sensing a phase difference between said color burst signal from said second separator circuit means and said second reference frequency signal and producing an output signal indicative of said phase difference;

phase modulation circuit means coupled to receive said composite video signal from said variable delay line output and controlled by said output signal from said second phase detection means, for applying phase modulation to said composite video signal in accordance with said second phase detection means output signal;

low-pass filter means coupled to receive said output signal from said second phase detection means, for deriving a low-frequency signal component thereof;

summing circuit means for summing said low-frequency signal component of said second phase detection means output signal and said first phase detection means output signal, to produce a sum output signal, and;

parameter control circuit means coupled to receive said sum output signal, for varying said control parameter of said variable delay line in accordance with said sum output signal, to thereby vary said amount of delay applied to said composite video signal by said variable delay line in accordance with the sum of said low-frequency component of said second phase detection means output signal and said output signal from said first phase detection means.

2. An apparatus according to claim 1, in which said video signal reproduction device further produces at least one control signal indicative of a status of said reproduced composite video signal therefrom, and in which the apparatus according to the present invention further comprises:

signal status sensing means responsive to said at least one control signal from said video signal reproduction apparatus, for detecting when a disturbed condition of said composite video signal has occurred, and for producing an output signal for the duration of said disturbed condition;

inhibit means controlled by said output signal from said signal status sensing means, for inhibiting input of said low-frequency signal component of said second phase detection means output signal to said summing circuit means during said disturbed condition of said composite video signal and for enabling transfer of said low-frequency signal component to said summing circuit means when recovery from said disturbed condition occurs.

3. An apparatus according to claim 2, in which said low-pass filter means comprise at least one capacitor having one terminal thereof connected to a fixed potential and a resistor connected in series between the output of said second phase detection means and the other terminal of said capacitor, and in which said inhibit means comprise switch means responsive to said output signal from said signal status sensing means for applying a short-circuit across said capacitor.

4. An apparatus according to claim 1, in which said control parameter of said variable delay line is the frequency of a clock signal which is applied to drive said variable delay line, and in which said parameter control circuit means comprise a voltage-controlled oscillator circuit for generating said clock signal, said voltage controlled oscillator having a frequency of oscillation which is controlled in accordance with said sum signal from said summing circuit means.

5. An apparatus according to claim 1, in which said first separator circuit means are coupled to receive said composite video signal from said output of said variable delay line.

6. An apparatus according to claim 1, in which said first separator circuit means are coupled to receive said composite video signal from said input of said variable delay line.

* * * * *